United States Patent

Halmi

[15] 3,686,946
[45] Aug. 29, 1972

[54] FLOW METERING DEVICES OF THE PRESSURE DIFFERENTIAL PRODUCING TYPE

[72] Inventor: Dezsoe, Halmi, Cranston, R.I.

[73] Assignee: General Signal Corporation, Providence, R.I.

[22] Filed: June 22, 1970

[21] Appl. No.: 48,341

Related U.S. Application Data

[62] Continuation-in-part of Ser. No. 873,164, Nov. 3, 1969, abandoned.

[52] U.S. Cl. .......................................... 73/213
[51] Int. Cl. .......................................... G01f 1/00
[58] Field of Search ............................... 73/213

[56] References Cited

UNITED STATES PATENTS

| | | | |
|---|---|---|---|
| 2,868,013 | 1/1959 | Terrell | 73/213 |
| 2,284,013 | 5/1942 | Pardoe | 73/213 |
| 2,217,668 | 10/1940 | Burdsal | 73/213 X |
| 2,842,962 | 7/1958 | Dall | 73/213 X |
| 3,273,390 | 9/1966 | Brown | 73/213 |

FOREIGN PATENTS OR APPLICATIONS

| | | |
|---|---|---|
| 198,691 | 3/1924 | Great Britain |
| 1,018,396 | 1/1966 | Great Britain |
| 1,047,280 | 11/1966 | Great Britain |
| 1,089,203 | 11/1967 | Great Britain |

*Primary Examiner*—Richard C. Queisser
*Assistant Examiner*—John P. Beauchamp
*Attorney*—Dodge and Ostmann

[57] ABSTRACT

Fluid flow metering devices of the pressure differential producing type comprising a tube having a converging section which guides the fluid to a throat. The internal geometry of each tube controls the velocity distribution in the flowing stream by causing the fluid, at least once, to form a vena contracta and then expand and reattach to the tube wall before reaching a static pressure-sensing tap in the throat wall. Preferably one vena contracta is formed in the throat entrance, and at least one other vena contracta is created in the converging section. However, a single vena contracta in either location may be used. An additional vena contracta, or several vena contractas, may also be created in the flowing stream upstream of the inlet pressure-sensing tap.

12 Claims, 7 Drawing Figures

Patented Aug. 29, 1972

INVENTOR
DEZSOE HALMI

BY *Dooly & Ostmann*

ATTORNEYS

INVENTOR
DEZSOE HALMI

BY Dodge + Ostmann

ATTORNEYS

Patented Aug. 29, 1972 3,686,946

INVENTOR
DEZSOE HALMI

BY *Dodge & Ostman*

ATTORNEYS

CROSS-REFERENCE TO RELATED APPLICATION

This application is a continuation-in-part of application Ser. No. 873,164, filed Nov. 3, 1969, now abandoned.

BACKGROUND AND SUMMARY OF THE INVENTION

It is common practice to measure the rate of flow of fluid through a pipe using a metering device of the pressure differential producing type. These differential producers frequently take the form of a tube having a large inlet section which is joined to a throat of reduced cross section by a converging tube section, and which is provided with taps for sensing the static pressures in the inlet and throat sections. In the case of the Herschel or classical Venturi tube (see "Fluid Meters", 5th Edition, 1959, American Society of Mechanical Engineers), the taps sense pressures in regions where the flow is parallel with the axis. On the other hand, the variations of the classical Venturi known as flow tubes (see, for example, U.S. Pat. No. 2,704,555) employ taps which sense the pressures in regions where the direction of flow is forced to change by the hydraulic shape of the tube. In all of these tubes, the square root of the difference between the pressures sensed by the taps is proportional to the rate of flow for a certain range of Reynolds number. This relationship may be expressed mathematically by the equation $$Q = \frac{AC}{\sqrt{1-B^4}} \sqrt{2g\Delta H}$$

where:
- $Q$ is the flow rate in cubic feet per second,
- $A$ is the cross sectional area of the throat in square feet,
- $C$ is the discharge coefficient of the tube and equals the ratio of the actual to the theoretical flow rate,
- $B$ is the ratio of the throat diameter to the diameter of the inlet,
- $g$ is the acceleration due to gravity, and
- $\Delta H$ is the differential pressure expressed in terms of feet of line fluid at line conditions.

There is no known method of calculating the discharge coefficient $C$, so it must be established for each tube by calibration. Changes in the flow pattern, i.e., the velocity distribution across the pipe, affect the discharge coefficient to varying degrees depending upon the kind and severity of flow pattern defect, the type of differential producer, the Beta ratio $B$, and the distance between the tube and the source of the flow pattern defect. Because of this, it is important to provide flow having a normal pattern, i.e., uniform velocity distribution, during the calibration procedure.

Although a particular differential producer may have been calibrated very accurately, this knowledge is of little value if the device is used in an installation in which the flow pattern is different. In view of this, it is customary to use one or more of the following techniques in order to reduce the effects of installation characteristics:

a. provide a long, straight approach pipe immediately upstream of the differential producer,
b. install flow straighteners in the upstream pipe,
c. use a differential producer having a small Beta ratio, and
d. calibrate the differential producer under conditions simulating those which will be encountered in actual service.

These techniques have proven effective, but each has drawbacks. For example, the first cannot be used in many cases because of space limitations, the second is expensive, increases head losses, and occasionally is ineffective or even detrimental, the third increases head losses and can result in the production of intolerably large pressure differentials, and the fourth is expensive and sometimes is impossible to implement. Moreover, none of these measures is capable of avoiding the adverse effect on discharge coefficient of changes in the surface roughness of the pipe wall. Since most differential producers are installed in carbon steel or cast iron pipe, surface roughness and pipe diameter do change during long periods of usage as a result of corrosion and erosion. These two conditions produce an axis-symmetrical flow pattern abnormality which alters the discharge coefficient. And, since the effect varies with length of service, it is evident that none of the techniques just mentioned provides a long-term correction.

The object of this invention is to reduce the adverse effects on discharge coefficient of all types of flow pattern abnormalities without resorting to the expensive measures which characterize the classical Venturi tube. The invention provides a new differential producer having an internal wall shaped to control the velocity distribution in the flowing stream by causing the fluid to form at least one vena contracta, with subsequent expansion and reattachment to the tube wall, between the inlet and throat pressure-sensing taps. If desired, another similar vena contracta, or several vena contractas, may be created upstream of the inlet pressure-sensing tap. The vena contractas tend to normalize the velocity distribution in the fluid stream passing the pressure-sensing taps, and thus make the metering device less sensitive to flow pattern changes and/or abnormalities in the entering stream.

In its preferred form, the new differential producer creates a vena contracta in the converging section, and a second vena contracta in the throat adjacent to its entrance. Tests show that this tube is less sensitive to axis-symmetrical flow pattern defects than the classical Venturi tube, which is generally considered the least sensitive, and therefore most accurate, tube on the market today, and that its discharge coefficient remains constant at all Reynolds numbers above 25,000. Moreover, the preferred tube also affords the following desirable characteristics:

1. It is as insensitive to asymmetrical flow pattern defects as the classical Venturi tube, but does not require annular pressure-sensing taps,
2. With regard to head losses, length and cost, it is comparable to the flow tube,
3. Pulsations in the pressures sensed by the taps are minimized,
4. The degree of flow pattern control can be changed easily, 5. It can be used in the same range of line sizes as the classical Venturi tube,
6. It has the same adiabatic expansion factor $Y$ as the classical Venturi tube,
7. It is less sensitive to manufacturing tolerances than any known tube, and
8. It provides a higher degree of uncalibrated accuracy than any known tube.

In short, since the preferred embodiment performs better than the classical Venturi tube, and affords the same cost and length advantages as the flow tube, it may be considered a truly universal differential producer.

In other versions of the new flow metering tube, the velocity distribution across the flow stream passing the throat tap is controlled by a single vena contracta formed either in the converging section of the tube or in the throat entrance. While these embodiments do not appear to possess the full universal character of the preferred instrument, nevertheless they do afford cost and size advantages in relation to the classical Venturi tube, and are superior to flow tubes from the performance standpoint.

BRIEF DESCRIPTION OF THE DRAWINGS

Several embodiments of the invention are described herein with reference to the accompanying drawings in which.

DETAILED DESCRIPTION OF ILLUSTRATED EMBODIMENTS

Figure 1:
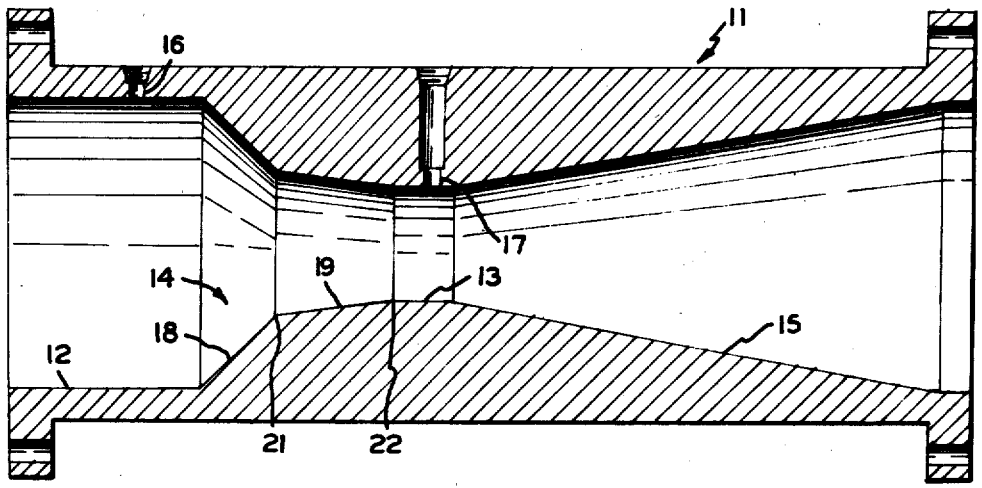
FIG. 1 is an axial sectional view of a flange ended version of the preferred tube.

As shown in FIG. 1, the invention is embodied in a flange ended tube 11 including a cylindrical inlet section 12, a cylindrical throat 13 of reduced cross section, and interconnecting converging section 14, and a diffuser section 15, all of which sections are coaxial. The design of the diffuser forms no part of the invention, and this element may be omitted in cases where good head recovery is not desired. The inlet and throat sections are provided with static pressure taps 16 and 17, respectively, which furnish to the secondary portion of the flow meter (not illustrated) the pressures from which the rate of flow is derived. These taps are constructed in the conventional manner.

The converging section 14 of tube 11 consists of two intersecting conical surfaces 18 and 19 having different included angles; the downstream surface 19 preferably having the smaller included angle in the interests of avoiding cavitation in the tube. In a typical case, the two included angles are on the order of 80° and 14°. The edges or corners 21 and 22 defined by the intersections of surfaces 18 and 19 and of surfaces 19 and 13, respectively, are sharp, or at least not intentionally rounded, so they constitute means for causing the fluid to form vena contractas. As indicated by the gradient curve of FIG. 2, the fluid forms one well defined jet in converging section 14 at station $A$, reattaches to the surface 19 at station $A'$, forms a second, but less pronounced, jet in the throat at station $B$, and then again reattaches to the wall of the tube at station $B'$. The throat tap 17 is located at or slightly downstream of station $B'$ so that it senses true static pressure. This location is desirable because it makes the tap less sensitive to asymmetrical flow patterns and tends to minimize noise, i.e., pulsations, in the sensed pressure.

Figure 5:
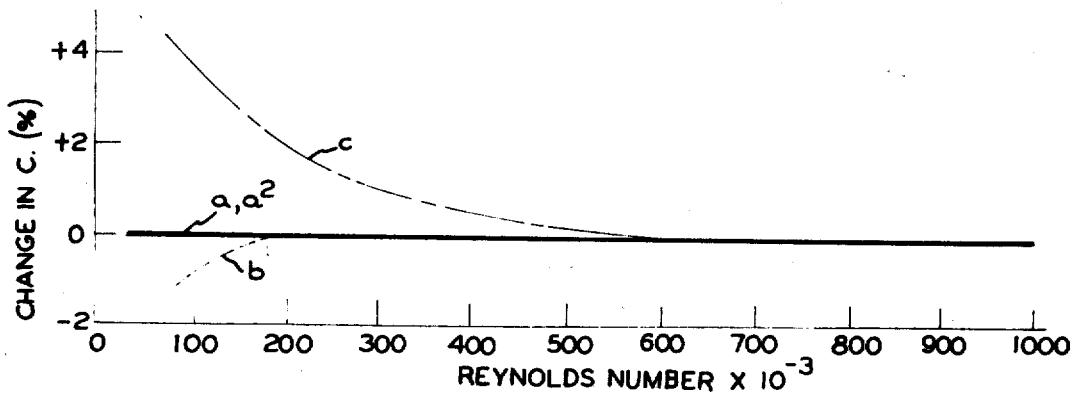
FIG. 5 is a graph comparing the sensitivities of the preferred embodiment (curves $a$ and $a^2$), a classical Venturi tube (curve $b$), and a flow tube (curve $c$) to changes in Reynolds number.
Figure 3:
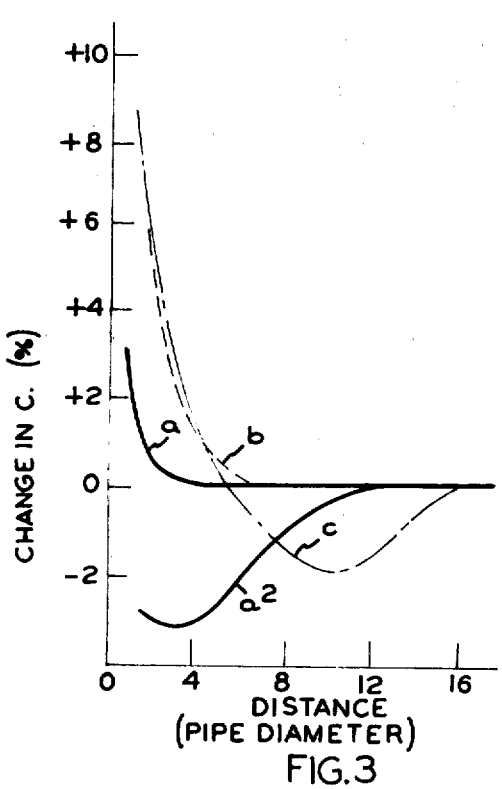
FIG. 3 is a graph comparing the sensitivities of the preferred embodiment (curves $a$ and $a^2$), a classical Venturi tube (curve $b$), and a flow tube (curve $c$) to the flow pattern abnormalities produced by an increaser in the upstream pipe.
Figure 4:
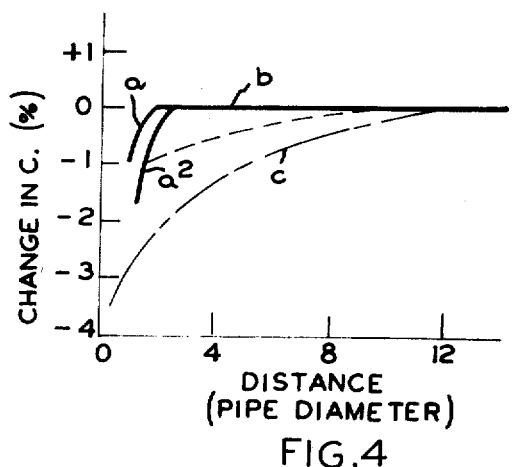
FIG. 4 is a graph comparing the sensitivities of the preferred embodiment (curves $a$ and $a^2$), a classical Venturi tube (curve $b$), and a flow tube (curve $c$) to the flow pattern abnormalities produced by a reducer in the upstream pipe.

The flow pattern-controlling effect of the vena contractas created by the tube 11 has been demonstrated by tests in which the performance of the new tube 11 was compared with that of classical Venturi tubes and flow tubes. Some of the test results are presented in FIGS. 3–5, wherein the solid curves $a$ apply to tube 11, the dashed curves $b$ apply to the classical Venturi tube, and the dot-dash curves $c$ apply to the flow tube. This group of tests used tubes designed for a 6-inch line and having Beta ratios of 0.75. The curves of FIG. 3 show the effect on discharge coefficient of the axis-symmetrical flow pattern defects produced by a standard 4 x 6 increaser, i.e., a conical pipe section whose diameter increases from 4 inches to 6 inches in the direction of flow. The increaser was inserted in the pipe line upstream of the tube and spaced from the inlet pressure tap by straight approach pipes of different lengths. FIG. 4, on the other hand, presents the results of similar tests using a standard 8 x 6 reducer, i.e., a conical pipe section whose diameter decreases from 8 inches to 6 inches in the direction of flow. These tests show clearly that the new tube 11 is less sensitive to flow pattern abnormalities of the axis-symmetrical type than its prior art counterparts. One practical advantage of this is that the new tube can afford the same degree of metering accuracy with shorter straight approach piping.

The tests reported in FIGS. 3 and 4 were run at one Reynolds number, but the superior performance of tube 11 was confirmed by additional tests run at different Reynolds numbers. Equally important, the additional increaser and reducer tests showed that, unlike the curves b and c of the classical Venturi and flow tubes, the error curve a of tube 11 does not change significantly with Reynolds number.

The conclusions drawn from the increaser and reducer tests are further supported by tests conducted to determine the effect of Reynolds number itself on the discharge coefficient. The results of the tests for tubes having a Beta ratio of 0.75 are presented in FIG. 5. Other similar tests were run to compare classical Venturi and flow tubes having a Beta ratio of 0.4, the usual lower limit of the ratio range, with a new tube 11 having the even lower Beta ratio of 0.3. These tests showed that the discharge coefficient of the new differential producer remains constant at much lower Reynolds numbers than the coefficients of the other tubes. They also revealed that the absolute value of the coefficient for the new tube varies only about 0.2 percent for Beta ratios between 0.3 and 0.75. Thus, as in the case of the classical Venturi tube, the new tube 11 is insensitive to changes in Beta ratio.

It can be inferred from the preceding tests that the new tube is less sensitive to axis-symmetrical flow pattern abnormalities resulting from changes in the surface roughness of the piping. However, this has been proved by inserting corroded pipe sections into the flow line upstream of the tube. For example, tests have shown that the addition of a corroded pipe section, which produced 0.5 percent and 3 percent changes, respectively, in the discharge coefficients of the classical Venturi and flow tubes, produced no appreciable change in the discharge coefficient of a comparable tube 11. Further tests also showed that tube 11 is less sensitive to changes in the geometry and surface finish of its internal walls than prior differential producers. The results of tests conducted on two tubes having Beta ratios of 0.75 and 0.3 are as follows:

| Beta = 0.75 | |
| --- | --- |
| Change in tube contour | Resulting percent change in C |
| Increased included conical angle of surface 18 by 40° | +1.02 |
| Increased roughness of surface 18 from 20 to 1,000 microinches | −0.42 |
| Increased roughness of upstream half of surface 19 from 20 to 600 microinches | −0.70 |

| Beta = 0.3 | |
| --- | --- |
| Change in tube contour | Resulting percent change in C |
| Increased included conical angle of surface 18 by 20° | +0.28 |
| Increased roughness of surface 18 from 20 to 1,000 microinches | −0.12 |
| Increased roughness of upstream half of surface 19 from 20 to 400 microinches | −0.75 |

The change in surface roughness in each case was effected by coating the surface 18 or 19 with a mixture of epoxy paint and sand; therefore, the designated change affected not only the quality of the surface finish, but also the cross sectional area of the treated conical portion and the geometry of the intersection of the two cones. This fact further highlights the remarkable insensitivity of the new tube. On the basis of these tests, it should be evident first, that the surfaces 18 and 19 may be left in an as-cast condition, second, that corrosion and erosion of the interior surfaces during service will have little effect upon the metering accuracy of the tube, and third, that the discharge coefficient will be quite insensitive to the effects on surface finish and internal geometry of a change in the material from which the tube is constructed or in the method of fabrication.

As those skilled in the art know, most differential producers are installed without calibration. Each type is assigned an uncalibrated accuracy tolerance equal to twice the standard deviation of a large population of similar tubes which have been subjected to analysis. The common "2x Sigma" tolerance for the discharge coefficients of classical Venturi tubes and flow tubes is ±0.75 percent and ±1–3 percent, respectively. In contrast, experience with new tube 11 indicates that it can be assigned an accuracy level of about ±0.5 percent for Beta ratios between 0.3 and 0.65. Additionally, since the discharge coefficient of this tube is relatively insensitive to changes in Beta ratio, the number of tubes which must be tested to provide reliable uncalibrated accuracy values for a commercial line of instruments necessarily is much smaller than the number which must be tested in order to provide reliable accuracy values for a line of flow tubes.

It also is of interest to note that tests of the FIG. 1 embodiment indicate that most of its metering errors stem from only two manufacturing tolerances, namely the tolerances on the diameters of the inlet and throat sections. Since these dimensions of a particular tube can be measured easily, and the discharge coefficient for that instrument can be predicted accurately on the basis of accumulated test data, the tube manufacturer is able to assign calibrated accuracy levels to production tubes intended for many high accuracy applications without actually conducting calibration tests. As a result, the great expense and high risk of error entailed in conducting calibration tests are avoided.

The new tube obviously can be used to meter the flow of compressible as well as incompressible fluids. Air tests conducted with the FIG. 1 embodiment show that it has the same adiabatic expansion factor Y as comparable classical Venturi tubes. Thus, the tube's expansion factor can be accurately calculated in the same manner as the expansion factor for a classical Venturi tube. This feature further emphasizes the superiority of tube 11 over flow tubes because the latter cannot be used reliably as gas meters without conducting compressible flow tests.

Figure 2:
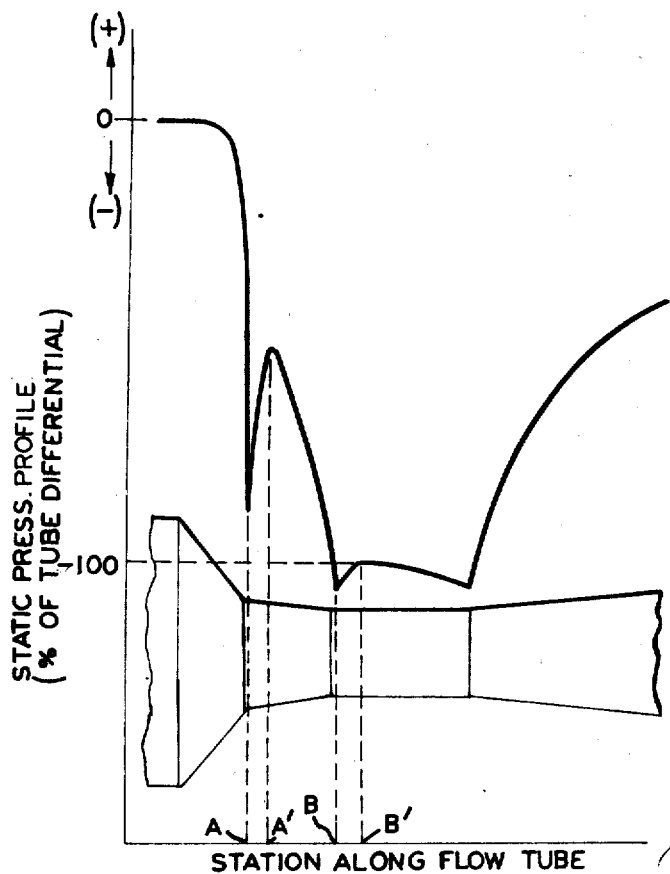
FIG. 2 is a graph showing the static pressure profile for the tube of FIG. 1, the ordinate representing the difference between the inlet and local static pressures expressed as a percent of the difference between the inlet and throat static pressures.

Referring back to the hydraulic grade line of FIG. 2, it will be noted that the static pressure increases rapidly at the entrance to recovery cone 15. This "explosion-like" increase in static pressure is attributable to the high level of turbulence in throat 13 produced by the flow-conditioning geometry of the tube, and it results in extremely low head losses. In analyzing head loss data, either of two approaches can be used. According to conventional practice, head losses are expressed as a percent of the tube's differential and are presented in the form of a curve showing the variation in this quantity with Beta ratio. On this basis, the tube 11 rates better than the classical Venturi tube and about the same as the flow tube. The last mentioned fact is significant because the new tube has a discharge coefficient comparable to that of the classical Venturi tube (i.e., a coefficient on the order of 0.98) and thus has a flow capacity much greater than the flow tube. The second, and better, approach is to compare the absolute head losses of the tubes. From this standpoint, tube 11 is clearly more efficient than its predecessors throughout the useful range of Beta ratios. And, its superiority over the flow tube is even more striking if the loss data is referenced to tubes affording equal installed accuracy. The reason for this is that the installed accuracy of a given flow tube can be matched by a tube 11 having a larger Beta ratio, and absolute head losses decrease as Beta ratio increases.

With regard to sensitivity to asymmetrical flow pattern defects produced, for example, by bends or corners in the upstream piping, the tube 11 proved to be equal to the classical Venturi tube even though it employs single, rather than annular, pressure-sensing taps. This finding is especially important because the single pressure-sensing tap is less expensive to make, particularly in molded tubes, and is less prone to clogging by solids in the fluid being metered.

Expect at high Beta ratios, where installed accuracy is far more important than laying length, and tube 11 is intentionally made longer so that optimum installed accuracy can be realized, the new tube is comparable to the flow tube as far as laying length and cost are concerned. With regard to performance considerations, including those already mentioned as well as insensitivity to conditions created by valves or pipe bends downstream of the meter, the tube 11 is equal to or better than the calssical Venturi tube. In light of this, it follows that tube 11 is a truly universal flow metering device.

Figure 6:
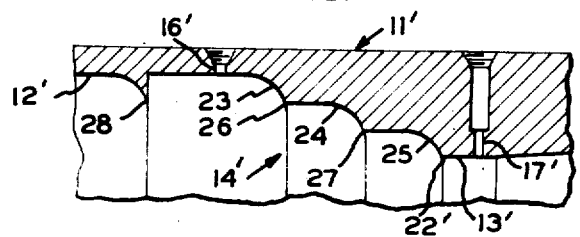
FIG. 6 is a fragmentary, half-sectional view of a second version of the new tube depicting optional and alternative features of the invention.

The flow pattern control afforded by the invention depends upon the presence of vena contractas and not upon the manner in which they are produced. Therefore, aside from manufacturing considerations, which favor the design of FIG. 1, the converging section of the tube may consist of a series of intersecting curved surfaces of elliptical or other shape. This possibility is illustrated in FIG. 6, wherein the converging section 14' includes curved surfaces 23–25.

In some cases the severity of the flow pattern defect in the entering stream may be such that the single vena contracta created in the converging section 14 of tube 11 will not be able to normalize the flow pattern to the extent required for acceptable metering accuracy. If this happens, the degree of flow pattern control afforded by the tube can be increased by altering its internal geometry so that several vena contractas are produced in the converging section. This feature also is incorporated in the tube 11' of FIG. 6. As in the case of the first embodiment, the fluid expanding from each of the jets created by edges 26 and 27 must be allowed to reattach to the wall of the tube before the next succeeding jet is created.

Experience indicates that the sensitivity of differential producers to changes in velocity distribution results mainly from the effect of the flow pattern changes on the pressure sensed by the throat tap. However, flow pattern changes do have some effect on the pressure at the inlet tap, so, if needed or desired, the performance of tube 11 can be improved somewhat by creating a vena contracta, or several vena contractas, in the flow stream upstream of the inlet tap. The internal geometry of the tube 11' of FIG. 6 provides this additional feature (see edge 28). As in the case of the converging and throat sections, the design of the inlet section 12' must allow for reattachment of the flow to the wall between successive vena contractas and before the flow reaches the static pressure-sensing tap 16'.

Figure 7:
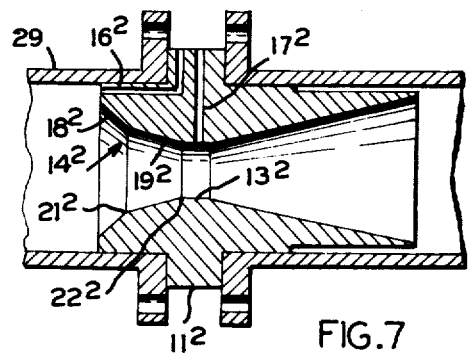
FIG. 7 is an axial sectional view of an insert version of the preferred tube.

Because of its length, the flange ended tube 11 of FIG. 1 cannot always be accommodated in existing piping systems. Therefore, the invention also provides an insert type of tube. As shown in FIG. 7, the insert tube $11^2$ has essentially the same internal geometry as the flange ended tube 11, except that it does not include a cylindrical inlet section. Although it is possible to use a static pressure inlet tap with the insert tube, as a practical matter this is not done because the tap would have to be located in the upstream pipe 29, rather than in the tube itself, and thus would have to be provided by the user of the tube and would require field calibration of the tube. Therefore, in lieu of a static tap, the insert version of the invention employs an impact tap $16^2$. While, as shown by the curves $a^2$ of FIGS. 3 and 4, the use of an impact tap makes the tube more sensitive to the flow pattern abnormalities produced by increasers and reducers, the curve $a^2$ of FIG. 5 demonstrates that the FIG. 7 version of the invention is just as insensitive to changes in Reynolds number as the FIG. 1 version. And, except for the fact that its discharge coefficient varies slightly with Beta at high values of this ratio, the FIG. 7 insert embodiment affords essentially all of the other advantages of the FIG. 1 embodiment. Thus, when properly applied, this version may also be considered a universal differential producer.

The embodiments described above all employ at least two vena contractas to control the flow pattern in the tube throat, and this is necessary for true universality. However, the invention also encompasses other embodiments which do not exhibit this characteristic, or at least do not exhibit it in the same degree as the preferred embodiment. Two of these alternative versions are illustrated in FIGS. 8 and 9, and in each of these cases only a single vena contracta is created between the inlet and throat pressure-sensing taps.

Figure 8:
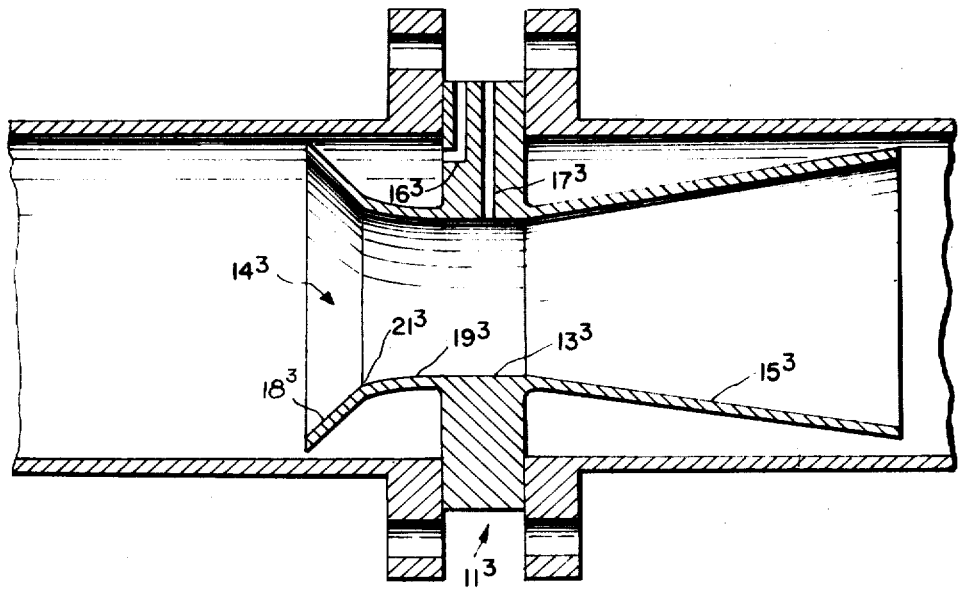
FIGS. 8 and 9 are axial sectional views of two additional embodiments, each of which controls the flow pattern in the throat by means of a single vena contracta.

In FIG. 8, the converging section $14^3$ of the tube $11^3$ consists of a conical upstream portion $18^3$ and a smoothly curved downstream portion $19^3$. At its downstream end, portion $19^3$ is tangent to cylindrical throat $13^3$, but, at its left end, this portion intersects cone $18^3$ to form a sharp edge $21^3$. The change in direction of the converging wall at edge $21^3$ is sufficiently abrupt to cause the flowing stream to form a vena contracta. Downstream of the vena contracta, the stream expands and reattaches to the wall of curved portion $19^3$, so the stream is attached to the wall when it passes the throat pressure-sensing tap $17^3$. Therefore, as in the earlier embodiments, this tap senses true static pressure.

Figure 9:
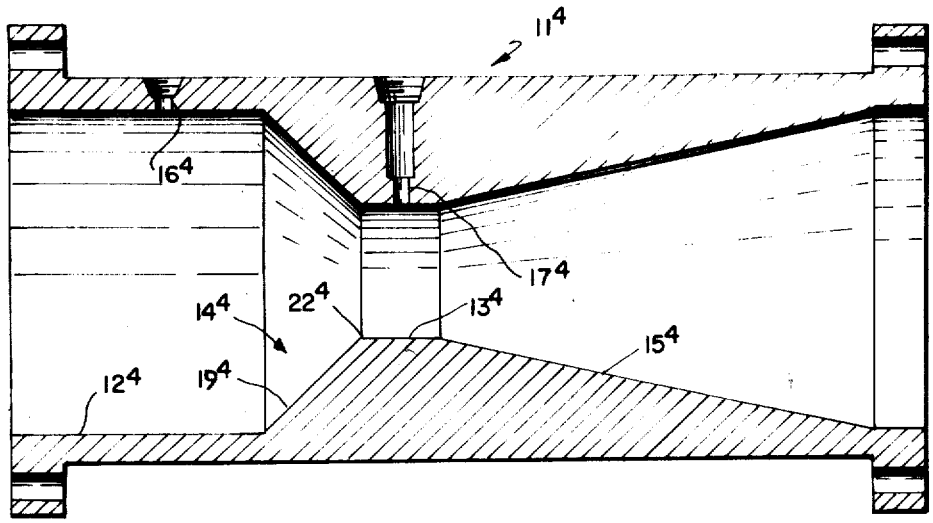

In FIG. 9, the converging section $14^4$ consists solely of a conical wall $19^4$. This wall intersects the cylindrical throat $13^4$ at a sharp edge $22^4$ and, as a result, the fluid stream is caused to form a vena contracta in the throat adjacent its entrance end. As before, the fluid is allowed to expand from this vena contracta and reattach to the throat wall upstream of pressure-sensing tap $17^4$. Since the change in flow direction at edge $22^4$ is much greater than the change at edge 22 in FIG. 1, and consequently the vena contracta is much more pronounced, throat $13^4$ must be longer than its FIG. 1 counterpart in order to insure that tap $17^4$ senses true static pressure. Using representative examples, the ratio of throat length to throat diameter in FIG. 1 is about 0.5, whereas in FIG. 9 the same ratio is about 0.6. Furthermore, because of the smaller effective flow area of the vena contracta, this tube $11^4$ will cavitate at a lower flowrate than the other versions of the invention. It is appropriate to remark here that throats having small length-to-diameter ratios on the order of those just mentioned are characterized by static pressure profiles which are substantially symmetrical and have well defined peaks located at the geometric centers of the throats. This result is important from the standpoint of the "2 Sigma" accuracy tolerance because it minimizes the effects on discharge coefficient of the manufacturing tolerances on throat length and throat tap location and of changes in the surface roughness of the throat wall.

The table which follows presents a qualitative comparison of the important performance characteristics of the universal differential producer of FIGS. 1, 6 and 7 (labeled U.T.), the secondary embodiments of FIGS. 8 and 9, the classical Venturi tube (labeled C.V.), and the flow tube (labeled F.T.). In this comparison, the ratings 1, 2, 3 and 4 represent excellent, good, fair and poor, respectively.

| Performance characteristics | Ratings | | | | |
|---|---|---|---|---|---|
| | U.T. | Fig. 8 | Fig. 9 | C.V. | F.T. |
| a. Insensitivity of C to changes in B | 1 | 1 | 2 | 1 | 4 |
| b. Insensitivity of C to changes in Reynolds Number | 1 | 2 | 2 | 2 | 4 |
| c. Insensitivity of C to changes in line size | 1 | 1 | 1 | 1 | 3–4 |
| d. Accuracy with which C can be predicted from measured dimensions of instrument | 1 | 2 | 1 | 2 | 4 |
| e. "2x Sigma" accuracy level | 1 | 2 | 2 | 2 | 4 |
| f. Insensitivity of C to axis-symmetrical flow pattern abnormalities | 1 | 2 | 2 | 2 | 4 |
| g. Insensitivity of C to asymmetrical flow pattern abnormalities | 1 | 1 | 2 | 1 | 4 |
| h. Insensitivity of C to corrosion and erosion of upstream pipe wall | 1 | 2 | 1 | 2 | 4 |
| i. Insensitivity of C to corrosion and erosion of instrument wall | 1 | 2 | 1 | 2 | 3–4 |
| j. Insensitivity of C to changes in materials or methods of construction | 1 | 1 | 1 | 1 | 3–4 |
| k. Insensitivity of C to downstream conditions (e.g., valves or bends in pipe) | 1 | 1 | 1 | 1 | 2 |
| l. Permits accurate calculation of adiabatic expansion factor Y | 1 | 1 | 2 | 1 | * |
| m. Head recovery | 1 | 1 | 2 | 2 | 1 |
| n. Minimization of differential noise | 1 | 1 | 2 | 1 | 4 |
| o. Self-scouring of tube wall | 1 | 1 | 2 | 1 | 4 |
| p. Ability to use either static or impact (i.e., corner) tap in inlet | 1 | 1 | 1 | ** | ** |
| q. Insensitivity of C to dimensional changes resulting from thermal stresses | 1 | 1 | 1 | 1 | 4 |

Notes:
*Adiabatic expansion factor Y cannot be calculated accurately, but must be determined empirically.
**The classical Venturi tube is not available with impact tap, and the flow tube is not available with a static inlet tap.

What is claimed is:

1. A flow metering device (11, $11^1$ or $11^2$) of the pressure differential producing type including
 a. a tube having a wall which defines a throat (13, $13^1$ or $13^2$) and a converging section (14, $14^1$ or $14^2$) for guiding fluid thereto from an inlet region of larger cross section;
 b. a pressure tap (16, $16^1$ or $16^2$) for sensing the pressure in the inlet region;
 c. a pressure tap (17, $17^1$ or $17^2$) for sensing static pressure in the throat at a point where the flow is attached to the tube wall; and
 d. the tube wall being shaped to cause the fluid passing from the inlet region to the throat pressure-sensing tap to
  1. form at least one vena contracta in the converging section (14, $14^1$ or $14^2$) and then expand and reattach to the wall of that section, and
  2. form another vena contracta in the throat (13, $13^1$ or $13^2$) adjacent its entrance and then to reattach to the wall of the throat.

2. The flow metering device (11 or $11^2$) defined in claim 1 in which,
 a. the throat (13 or $13^2$) has a cylindrical wall;
 b. the converging section (14 or $14^2$) includes a first conical portion (19 or $19^2$) which intersects the cylindrical throat wall along a continuous edge (22 or $22^2$) which causes the fluid to form said another vena contracta in the throat;
 c. The converging section includes a second conical portion (18 or $18^2$) upstream of and having a larger conical angle than the first such portion (19 or $19^2$); and
 d. the two conical portions intersect at a continuous edge (21 or $21^2$) which causes the fluid to form said one vena contracta and reattach to the first conical portion (19 or $19^2$).

3. The flow metering device (11, $11^1$ or $11^2$) defined in claim 1 in which the length of the throat (13, $13^1$ or $13^2$) is materially less than its diameter.

4. The flow metering device (11, $11^1$ or $11^2$) defined in claim 3 in which the length of the throat (13, $13^1$ or $13^2$) is on the order of one-half its diameter.

5. The flow metering device (11, $11^1$ or $11^2$) defined in claim 4 in which the throat pressure-sensing tap (17, $17^1$ or $17^2$) is located at the point (B') where the fluid expanding from the vena contracta in the throat reattaches to the throat wall.

6. The flow metering device ($11^1$) defined in claim 1 in which the wall of the converging section ($14^1$) is shaped to cause the fluid to form a series of vena contractas and to reattach to the wall of the converging section between successive vena contractas as well as after the last vena contracta.

7. The flow metering device (11¹) defined in claim 1 in which
   a. the wall of the flow tube also defines an inlet section (12¹) which is joined to the throat (13¹) by the converging section (14¹);
   b. said inlet pressure-sensing tap (16¹) is a static pressure tap in the wall of the inlet section (12¹); and
   c. the wall of the inlet section (12¹) is shaped to cause the fluid, at least once during its passage therethrough, to form a vena contracta and then to expand and reattach to the wall of this section before reaching the inlet pressure-sensing tap (16¹).

8. The flow metering device (11, 11¹, or 11²) defined in claim 1 in which the wall shape is such that the vena contracta in the throat entrance is less pronounced than any vena contracta formed in the converging section.

9. A flow metering device (11, 11¹, 11², 11³ or 11⁴) of the pressure differential producing type including
   a. a tube having a wall which defines a throat (13, 13¹, 13², 13³ or 13⁴) whose length is materially less than its diameter, and a converging section (14, 14¹, 14², 14³ or 14⁴) for guiding fluid thereto from an inlet region of larger cross section;
   b. a pressure tap (16, 16¹, 16², 16³ or 16⁴) for sensing the pressure in the inlet region;
   c. a pressure tap (17, 17¹, 17², 17³ or 17⁴) for sensing static pressure in the throat at a point where the flow is attached to the wall; and
   d. the tube wall being shaped to cause the fluid, at least once during its passage from the inlet region to the throat pressure-sensing tap, to form a vena contracta and then to expand and reattach to the wall at a point downstream of the vena contracta.

10. The flow metering device (11, 11¹, 11², 11³ or 11⁴) defined in claim 9 in which the throat (13, 13¹, 13², 13³, or 13⁴) has a length on the order of one-half its diameter.

11. The flow metering device (11, 11² or 11⁴) defined in claim 9 in which
    a. the throat (13, 13² or 13⁴) has a cylindrical wall;
    b. the wall of the converging section (14, 14² or 14⁴) includes a conical portion (19, 19² or 19⁴) which intersects the cylindrical wall along a continuous edge (22, 22² or 22⁴) which causes the fluid to form a vena contracta in the throat (13, 13² or 13⁴) and then reattach to the throat wall; and
    c. the throat pressure-sensing tap (17, 17² or 17⁴) is located at the point (B′) at which the fluid reattaches to the throat wall.

12. The flow metering device (11³) defined in claim 9 in which
    a. the throat (13³) has a cylindrical wall;
    b. the converging portion (14³) includes a conical upstream portion (18³) and a smoothly curved downstream portion (19³);
    c. the two portions (18³, 19³) intersect at a continuous edge (21³) which causes the fluid to form a vena contracta and reattach to the downstream portion (19³); and
    d. the downstream portion (19³) is joined smoothly to the cylindrical wall (13³) of the throat.

* * * * *